(12) United States Patent
Meacham et al.

(10) Patent No.: US 11,501,772 B2
(45) Date of Patent: Nov. 15, 2022

(54) CONTEXT AWARE HEARING OPTIMIZATION ENGINE

(71) Applicant: Dolby Laboratories Licensing Corporation, San Francisco, CA (US)

(72) Inventors: Jacob Meacham, San Francisco, CA (US); Matthew Sills, San Francisco, CA (US); Richard Fritz Lanman, III, San Francisco, CA (US); Jeffrey Baker, Newbury Park, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1 day.

(21) Appl. No.: 16/780,825

(22) Filed: Feb. 3, 2020

(65) Prior Publication Data
US 2020/0380979 A1 Dec. 3, 2020

Related U.S. Application Data

(63) Continuation of application No. 15/851,291, filed on Dec. 21, 2017, now abandoned, which is a
(Continued)

(51) Int. Cl.
| | |
|---|---|
| *G10L 15/22* | (2006.01) |
| *G10L 21/0208* | (2013.01) |
| *G10L 25/51* | (2013.01) |
| *G10L 15/06* | (2013.01) |
| *G10L 15/30* | (2013.01) |
| *G10L 21/028* | (2013.01) |
| *G10L 25/30* | (2013.01) |
| *G10L 25/84* | (2013.01) |

(Continued)

(52) U.S. Cl.
CPC ............ *G10L 15/22* (2013.01); *G10L 15/063* (2013.01); *G10L 15/30* (2013.01); *G10L 21/0208* (2013.01); *G10L 21/028* (2013.01); *G10L 25/30* (2013.01); *G10L 25/51* (2013.01); *G10L 25/84* (2013.01); *G10L 21/0364* (2013.01); *G10L 25/81* (2013.01); *G10L 2015/223* (2013.01); *H04R 2225/41* (2013.01); *H04R 2410/05* (2013.01); *H04R 2420/07* (2013.01)

(58) Field of Classification Search
None
See application file for complete search history.

(56) References Cited

U.S. PATENT DOCUMENTS

| | | |
|---|---|---|
| 7,263,486 B1 | 8/2007 | Hakkani-Tur |
| 8,484,025 B1 | 7/2013 | Moreno Mengibar |
| (Continued) | | |

OTHER PUBLICATIONS

Bach et al., Detecting Novel Objects in Acoustic Scenes Through Classifier Incongruence, INTERSPEECH 2010, Sep. 26-30, 2010.
(Continued)

*Primary Examiner* — Shaun Roberts

(57) ABSTRACT

One or more context aware processing parameters and an ambient audio stream are received. One or more sound characteristics associated with the ambient audio stream are identified using a machine learning model. One or more actions to perform are determined using the machine learning model and based on the one or more context aware processing parameters and the identified one or more sound characteristics. The one or more actions are performed.

24 Claims, 8 Drawing Sheets

Related U.S. Application Data continuation of application No. 15/282,860, filed on Sep. 30, 2016, now Pat. No. 9,886,954.

(51) Int. Cl.
  *G10L 21/0364* (2013.01)
  *G10L 25/81* (2013.01)

(56) References Cited

U.S. PATENT DOCUMENTS

| | | | |
|---|---|---|---|
| 8,571,871 B1 | 10/2013 | Stuttle | |
| 8,891,794 B1* | 11/2014 | Lin | G06F 16/68 |
| | | | 381/313 |
| 9,798,512 B1* | 10/2017 | Faaborg | G06F 3/167 |
| 9,813,810 B1* | 11/2017 | Nongpiur | G06N 3/0454 |
| 9,961,435 B1* | 5/2018 | Goyal | G10L 25/84 |
| 2002/0068986 A1* | 6/2002 | Mouline | A61B 5/121 |
| | | | 381/60 |
| 2006/0245724 A1 | 11/2006 | Hwang | |
| 2007/0225972 A1 | 9/2007 | Kim | |
| 2008/0137873 A1 | 6/2008 | Goldstein | |
| 2008/0212810 A1 | 9/2008 | Pedersen | |
| 2008/0235018 A1* | 9/2008 | Eggen | G10L 15/26 |
| | | | 704/251 |
| 2008/0310646 A1 | 12/2008 | Amada | |
| 2009/0010442 A1 | 1/2009 | Usher | |
| 2009/0055178 A1* | 2/2009 | Coon | G10L 17/00 |
| | | | 704/246 |
| 2009/0299725 A1 | 12/2009 | Grigsby | |
| 2010/0004926 A1 | 1/2010 | Neoran | |
| 2010/0008526 A1 | 1/2010 | De Vries | |
| 2010/0220879 A1 | 9/2010 | Feilner | |
| 2010/0254551 A1 | 10/2010 | Aoki | |
| 2011/0075851 A1 | 3/2011 | Leboeuf | |
| 2011/0158420 A1 | 6/2011 | Hannah | |
| 2012/0101807 A1 | 4/2012 | Heo | |
| 2012/0265717 A1 | 10/2012 | Narayanan | |
| 2013/0070928 A1 | 3/2013 | Ellis | |
| 2013/0090965 A1* | 4/2013 | Rivere | G06Q 10/06311 |
| | | | 705/7.15 |
| 2013/0142356 A1* | 6/2013 | Isaac | H04R 3/005 |
| | | | 381/92 |
| 2013/0184007 A1 | 7/2013 | Hategan | |
| 2013/0243227 A1 | 9/2013 | Kinsbergen | |
| 2013/0317815 A1* | 11/2013 | Hong | G10L 25/48 |
| | | | 704/232 |
| 2013/0343581 A1 | 12/2013 | Dyrlund | |
| 2014/0046878 A1 | 2/2014 | Lecomte | |
| 2014/0105433 A1 | 4/2014 | Goorevich | |
| 2014/0142958 A1 | 5/2014 | Sharma | |
| 2014/0348331 A1 | 11/2014 | Gran | |
| 2015/0046157 A1 | 2/2015 | Wolff | |
| 2015/0063575 A1 | 3/2015 | Tan | |
| 2015/0124984 A1 | 5/2015 | Han | |
| 2015/0161204 A1 | 6/2015 | Kim | |
| 2015/0172831 A1 | 6/2015 | Dittberner | |
| 2015/0213355 A1 | 7/2015 | Sharma | |
| 2015/0234805 A1 | 8/2015 | Caswell | |
| 2015/0254052 A1 | 9/2015 | Rill | |
| 2015/0355880 A1* | 12/2015 | Kraft | H04R 1/1091 |
| | | | 700/94 |
| 2015/0371638 A1 | 12/2015 | Ma | |
| 2016/0004723 A1* | 1/2016 | Pretel | G06F 16/29 |
| | | | 707/769 |
| 2016/0048596 A1 | 2/2016 | Papageorgiou | |
| 2016/0075016 A1 | 3/2016 | Laurent | |
| 2016/0117905 A1* | 4/2016 | Powley | G08B 1/08 |
| | | | 340/521 |
| 2016/0149547 A1 | 5/2016 | Rider | |
| 2016/0155452 A1 | 6/2016 | Sharifi | |
| 2016/0174001 A1 | 6/2016 | Ungstrup | |
| 2016/0249134 A1* | 8/2016 | Wang | H04R 3/005 |
| 2016/0255446 A1 | 9/2016 | Bernardi | |
| 2016/0357509 A1* | 12/2016 | Alsina | H04M 1/6083 |
| 2017/0201844 A1 | 7/2017 | Smith | |
| 2017/0278519 A1 | 9/2017 | Visser | |
| 2018/0077483 A1 | 3/2018 | Sahay | |

OTHER PUBLICATIONS

Bach, Jorg-Hendrik, et al. "Audio classification and localization for incongruent event detection." Detection and Identification of Rare Audiovisual Cues. Springer Berlin Heidelberg, Jan. 2012. pp. 39-46.

S M Shahriar Nirjon, a General-Purpose, Energy-Efficient, and Context-Aware Acoustic Event Detection Platform for Mobile Devices, Aug. 2014.

Zhang, Tong, et al. "Hierarchical classification of audio data for archiving and retrieving." Acoustics, Speech, and Signal Processing, 1999. Proceedings., 1999 IEEE International Conference on. vol. 6. IEEE, Mar. 1999, pp. 1-4.

Merkle, P. et al. "The Effects of Multiview Depth Video Compression on Multiview Rendering" Signal Processing: Image Communication, vol. 24, Issues 1-2, Jan. 2009, pp. 73-88.

\* cited by examiner

CONTEXT AWARE HEARING OPTIMIZATION ENGINE

CROSS REFERENCE TO OTHER APPLICATIONS

This application is a continuation of U.S. patent application Ser. No. 15/851,291 filed Dec. 21, 2017, which is a continuation of U.S. patent application Ser. No. 15/282,860 filed Sep. 30, 2016, both of which are incorporated herein by reference for all purposes.

BACKGROUND OF THE INVENTION

There are many scenarios where people may want to change the manner in which they hear an audio environment. For example, people at a concert may use earplugs to protect their hearing. People on an airplane may use noise cancellation headphones to block out engine noise while listening to music. People with hearing problems may choose to use a hearing aid to improve their hearing. When the audio characteristics of the audio environment change, people must manually decide how to react. For example, a concert goer is wearing ear plugs and someone is trying to talk to the concert goer. In most instances, the concert goer reacts by removing the ear plugs to hear the person speak. On an airplane, the airplane captain often gives a message over the PA system thirty minutes before landing the plane. In most instances, a passenger reacts by removing noise cancellation headphones from the passenger's head or by turning the noise cancellation headphones off. When faced with loud music, the person wearing a hearing aid often manually turns down the volume on the hearing aid, turns the hearing aid off, or takes the hearing aid out of his or her ear. Such solutions are inefficient when the audio environment is frequently changing because a person would be constantly inserting and removing ear devices to adjust to the new audio environment. It would be useful to have a device that is capable of handling changing audio environments.

BRIEF DESCRIPTION OF THE DRAWINGS

Various embodiments of the invention are disclosed in the following detailed description and the accompanying drawings.

DETAILED DESCRIPTION

Figure 1:
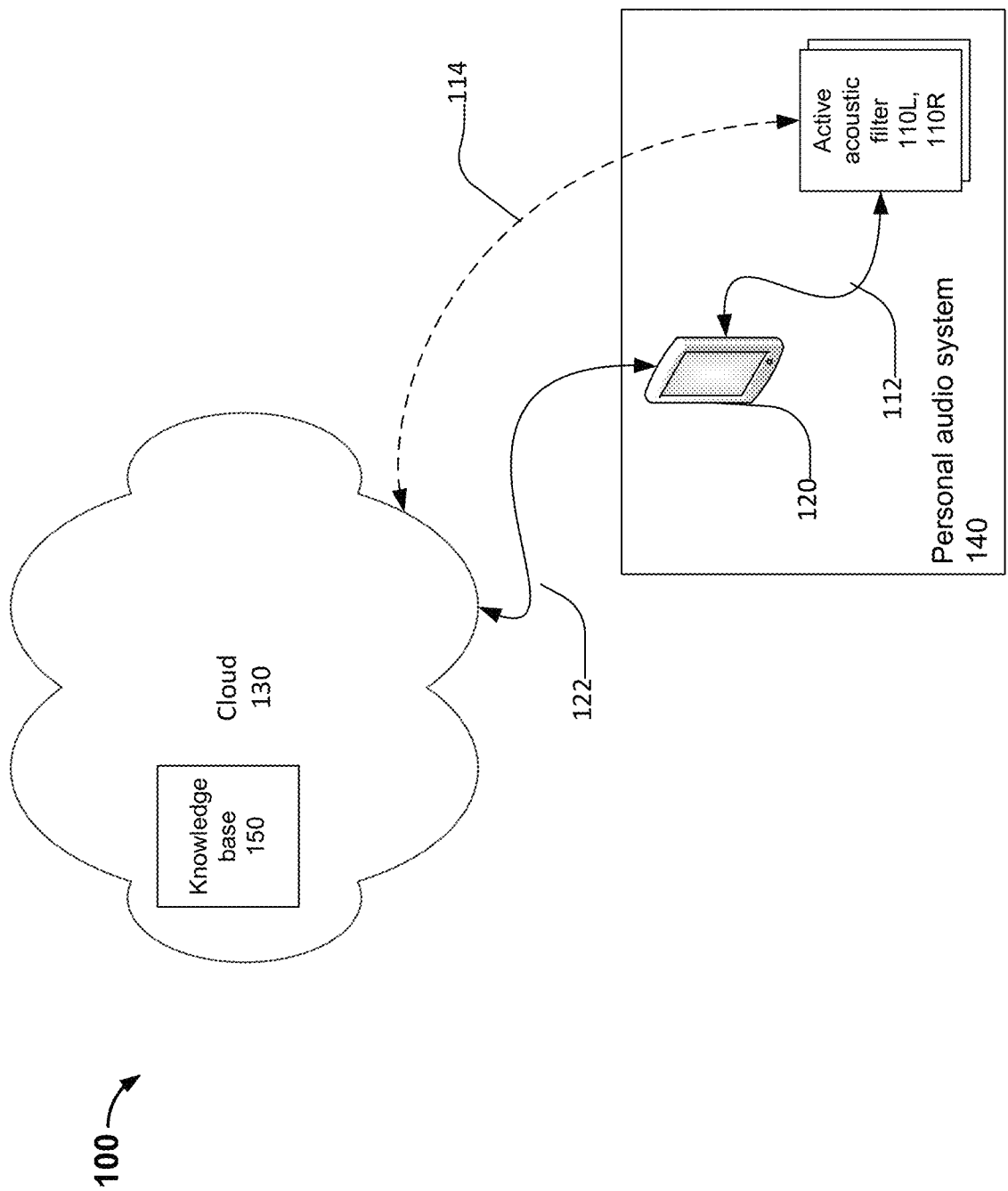
FIG. 1 is a block diagram illustrating an embodiment of a system for implementing a context aware hearing optimization engine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A context aware hearing optimization engine (CAHOE) is disclosed. The environment of a user provides a plethora of information that can be used to personalize the environment of the user. CAHOE is able to automatically adjust the manner in which a user experiences his or her auditory environment based on a context of the user. The context is comprised of one or more context aware processing parameters.

The one or more context aware processing parameters is comprised of current contextual state, one or more stored local contextual states of the user and/or one or more stored global contextual states of one or more other users. The current contextual state describes a current state of a user and/or the user's associated device. For example, the user's ambient sound environment, location, activity, device settings, time-based information, etc. can provide contextual state regarding the user's current environment. The stored local contextual state of the user is comprised of a plurality of parameters that describe a previous state of the user and the user's associated device, an action the user would most likely want to perform with respect to or by the user's associated device given certain contextual state, and an associated strength of recommendation that the user would want to perform the action. The current contextual state can be compared with the stored local contextual state and used to determine an action to perform with respect to the user's associated device.

The stored global contextual state is comprised of a plurality of context aware processing parameters that describe the environment of one or more other users. Similar to the user's stored local contextual state, the stored global contextual state can provide contextual state information regarding the environment of one or more other users in situations that are similar to the user and how systems associated with the one more other users were changed based on the one or more associated context aware processing parameters.

CAHOE is comprised of a hierarchical machine learning environment that can determine one or more actions to perform with respect to the device based on current contextual state, one or more stored local contextual states and/or one or more stored global contextual states. The first hierarchical level of the hierarchical machine learning environment is comprised of a plurality of machine learning models. Each machine learning model of the first hierarchical level has been trained to identify different characteristics of an ambient audio stream, such as whether the ambient audio stream matches a known ambient sound profile, includes a particular sound source, includes a particular type of audio signal, or includes one or more trigger words. For example, a first machine learning model of the first hierarchical level can be trained to identify if the ambient audio stream includes a siren and a second machine learning model of first hierarchical level can be trained to determine if the ambient audio stream includes speech. Each of the machine learning models of the first hierarchical level is configured to output a confidence value that indicates whether the ambient audio stream includes the characteristic to which the machine learning model is trained to identify.

The second hierarchical level of the hierarchical machine learning environment is comprised of a machine learning model that is configured to receive the output from each of the machine learning models of the first hierarchical level. The machine learning model is trained to determine the real characteristics of the ambient audio stream. For example, the ambient audio stream may cause a first machine learning model to output a value that indicates that the ambient audio stream includes a siren signal and a second machine learning model to output a value that indicates that the ambient audio stream includes a female voice, but the ambient audio stream causes a third machine learning model to output a value that indicates that the ambient audio stream does not include speech. Based on the set of input values, the machine learning model of the second hierarchical level is trained to determine the real characteristics of the ambient audio stream and output the determined characteristics.

The third hierarchical level of the hierarchical machine learning environment is comprised of a machine learning model that is configured to receive the output from the machine learning model of the second hierarchical level, and a combination of current contextual state, one or more stored local contextual states, one or more stored global contextual states. The machine learning model of the third hierarchical level is trained to determine one or more actions a user of the device would most likely want to be performed with respect to or by the user's device. For example, the one or more actions may include selecting a set of processing parameters that change the manner in which a user experiences his or her ambient sound environment, determining an action to perform with respect to the user's device, and/or determine a notification to provide to the user. For example, a first machine learning model of the first hierarchical level determines that an ambient audio stream includes a siren and a second machine learning model of the first hierarchical level determines that the siren is moving towards the user. The machine learning model of the second hierarchical level determines that the real characteristics of the ambient audio stream really indicate that a siren that is moving towards the user. The machine learning model of the third hierarchical level receives this information, and a combination of current contextual state (e.g., the user is currently at a corner of an intersection), one or more stored local contextual states, and one or more global contextual states, and determines to change the sound settings of the user's system such that the user can hear his or her surroundings, to close a text messaging application to prevent the user from being distracted, and/or to provide an audio warning that an ambulance is approaching.

A user may directly or indirectly provide feedback about the determined action. The feedback can be used to further train the machine learning models of the hierarchical machine learning environment. As a result, the CAHOE is able to better predict how a user desires to experience his or her environment.

FIG. 1 is a block diagram illustrating an embodiment of a system for implementing a CAHOE. In the example shown, a context aware hearing optimization system 100 includes at least one personal audio system 140 and a knowledgebase 150 located within a cloud 130. Cloud 130 can be a network of remote servers hosted on the Internet to store, manage, and process data. Knowledgebase 150 can include one or more servers and a database that stores one or more local contextual states associated with personal audio system 140 and global contextual state associated with one or more other personal audio systems (not shown). Knowledgebase 150 can also learn and store other knowledge derived from the local contextual data and the global contextual data.

Personal audio system 140 includes left and right active acoustic filters 110L, 110R and a personal computing device 120. Active acoustic filters 110L, 110R are configured to capture the ambient sound environment of personal audio system 140. Active acoustic filters 110L, 110R are configured to convert the ambient sound into an ambient audio stream and provide the ambient audio stream to personal computing device 120. Active acoustic filters 110L, 110R are configured to provide a modified version of the ambient sound of the ambient sound environment to a user of personal audio system 140.

Active acoustic filters 110L, 110R are configured to communicate with personal computing device 120 via first wireless communication link 112. While only a single first wireless communications link 112 is shown in FIG. 1, each active acoustic filter 110L, 110R may communicate with personal computing device 120 via separate wireless communication links. Wireless communications link 112 can use a limited-range wireless communications protocol such as Bluetooth®, WiFi®, ZigBee®, or some other wireless Personal Area Network (PAN) protocol. Alternatively, there can be a direct connection from personal computing device 120 to one of the active acoustic filters, and an indirect connection to the other active acoustic filter. The indirect connection can be through the direct connection, wherein the directly connected active acoustic filter acts as a relay to the indirectly connected active acoustic filter.

Personal computing device 120 is configured to upload local contextual state associated with a user of personal audio system 140 to knowledgebase 150. Personal computing device can also receive global contextual state associated with one or more other users of other personal audio systems. Personal computing device 120 communicates with cloud 130, for example, via a second communications link 122. In particular, personal computing device 120 can communicate with knowledgebase 150 within the cloud 130 via second communications link 122. Second communications link 122 can be a wired connection or a wireless communications link using, for example, the WiFi® wireless communications protocol, a mobile telephone data protocol, or another wireless communications protocol.

Acoustic filters 110L, 110R may communicate directly with the cloud 130 via a third wireless communications link 114. In some embodiments, acoustic filters 110L, 110R can upload local contextual state associated with a user of personal audio system 140 to knowledgebase 150. In some embodiments, acoustic filters 110L, 110R can receive global contextual state associated with one or more other users of other personal audio systems. Third wireless connection 114 can use, for example, the WiFi® wireless communications protocol or another wireless communications protocol. Acoustic filters 110L, 110R can communicate with each other via a fourth wireless communications link (not shown). This fourth wireless communication link can provide an indirect connection of one active acoustic filter to cloud 130 through the other active acoustic filter.

Personal computing device 120 is configured to receive an ambient audio stream from acoustic filters 110L, 110R. Personal computing device 120 can include one or more sensors that provide current contextual state associated with personal computing device 120. Personal computing device 120 can include a memory that stores one or more local contextual states that is associated with a user of personal audio system 140 and global contextual state that is associated with one or more other users of other personal audio systems. Based on the ambient audio stream and a combination of the current contextual state, one or more stored local contextual states, and/or one or more stored global contextual states, personal computing device 120 can determine one or more actions that a user of the personal audio system 140 would most likely want to be performed with respect to or by personal audio system 140. For example, the one or more actions can include selecting a set of audio processing parameters that change the manner in which a user experiences his or her ambient sound environment, determining an action to perform with respect to the personal computing device or the active acoustic filters, and/or determining a notification to provide to the user of personal audio system 140 via personal computing device 120 or active acoustic filters 110L, 110R. Personal computing device 120 can be a smart phone, a desktop computer, a mobile computer, a tablet computer, or any other computing device that is capable of performing the processes described herein. Personal computing device 120 can include one or more processors and memory configured to execute stored software instructions to perform the processes described herein.

Figure 2:
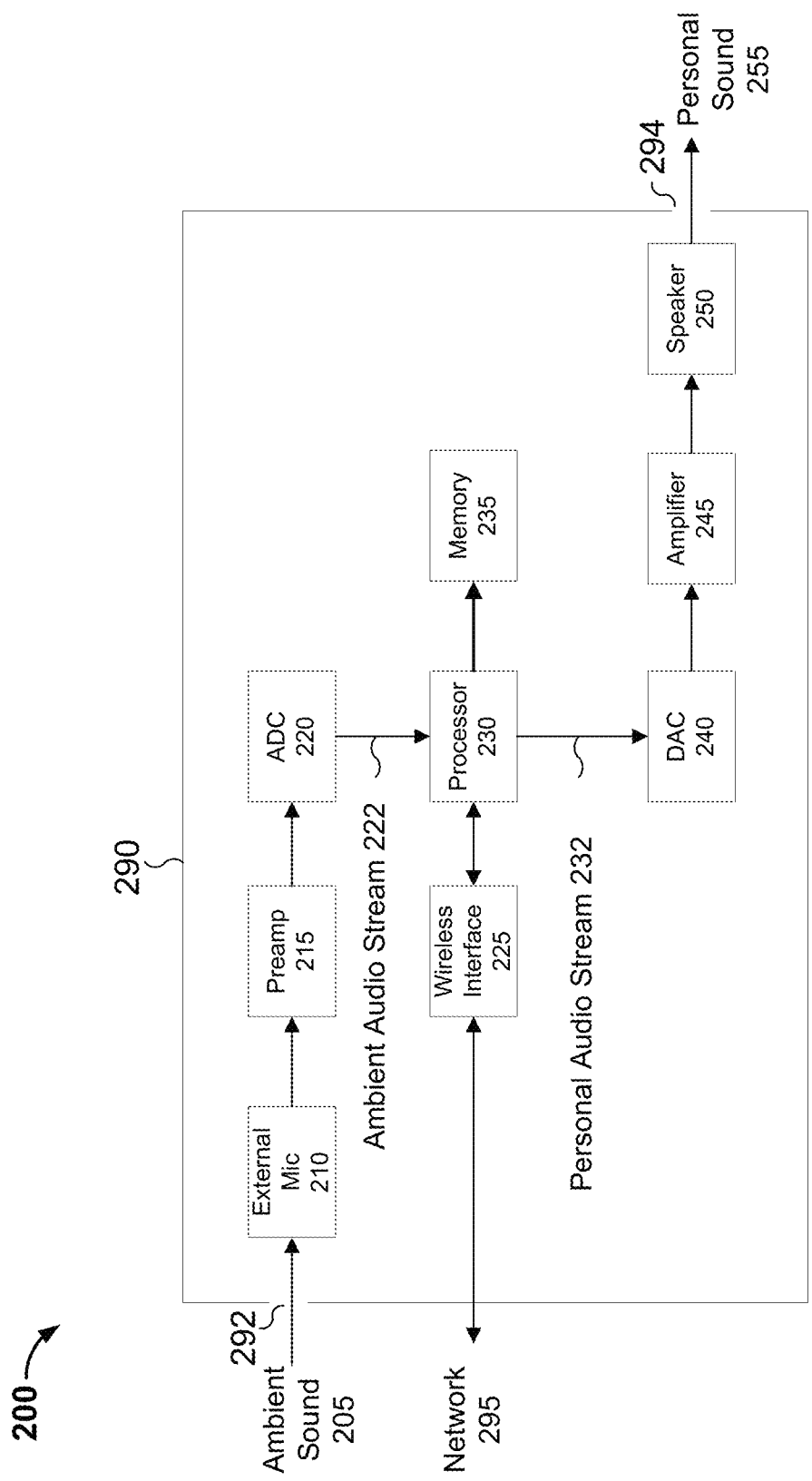
FIG. 2 is block diagram of an embodiment of an active acoustic filter.

FIG. 2 is block diagram of an embodiment of an active acoustic filter 200, which may be active acoustic filter 110L or active acoustic filter 110R. Active acoustic filter 200 includes at least one microphone 210, a preamplifier 215, an analog-to-digital (A/D) converter 220, a wireless interface 225, a processor 230, a memory 235, a digital-to-analog (D/A) converter 240, an amplifier 245, a speaker 250, and a battery (not shown), all of which may be contained within a housing 290. Active acoustic filter 200 is configured to receive ambient sound 205 and is configured to output personal sound 255. In this context, the term "sound" refers to acoustic waves propagating in air. "Personal sound" means sound that has been processed, modified, or tailored in accordance with a user's personal preferences. The term "audio" refers to an electronic representation of sound, which may be an analog signal or digital data.

Housing 290 can be configured to interface with a user's ear by fitting in, on, or over the user's ear such that ambient sound 205 is mostly excluded from reaching the user's ear canal and personal sound 255 generated by the active acoustic filter is provided directly into the user's ear canal. Housing 290 has at least a first aperture 292 for accepting ambient sound 205 and a second aperture 294 to allow the personal sound 255 to be output into the user's outer ear canal. Housing 290 may have more than one aperture for accepting ambient sound, each of which may be coupled to a separate microphone. Housing 290 may be, for example, an earbud housing. The term "earbud" means an apparatus configured to fit, at least partially, within and be supported by a user's ear. An earbud housing typically has a portion that fits within or against the user's outer ear canal. An earbud housing may have other portions that fit within the concha or pinna of the user's ear.

Microphone 210 is configured to convert ambient sound 205 into an electrical signal that is amplified by preamplifier 215 and converted into an ambient audio stream 222 by A/D converter 220. In this context, the term "stream" means a sequence of digital samples. The "ambient audio stream" is a sequence of digital samples representing the ambient sound received by active acoustic filter 200. Ambient audio stream 222 is processed by processor 230 to provide a personal audio stream 232. The processing performed by processor 230 will be discussed in more detail subsequently. Personal audio stream 232 is converted into an analog signal by D/A converter 240. The analog signal output from D/A converter 240 is amplified by amplifier 245 and converted into personal sound 255 by speaker 250.

Microphone 210 can be a semi-personal microphone, a fully personal microphone, a hybrid open air/personal microphone, or a beam forming microphone array that focuses on a direction of a speaker to which a user of the active acoustic filters is speaking and/or focuses on a direction of the user of the active acoustic filters. Beam forming is a signal processing technique that relies on spatial and acoustic information in order to achieve spatial selectivity and directionality. A single omnidirectional microphone offers no directionality because it responds equally to sounds coming from any direction. However, multiple microphones can be configured in an array separated by a known distance to form a directional response or beam pattern. The combination of a microphone array and a beam forming filter is more sensitive to sounds coming from a first direction than sounds coming from one or more other directions. Various array configurations may be implemented in a beam forming microphone array, including, but not limited to broadside arrays, which sum together the microphone signals, as well as differential endfire arrays, which sum together a front microphone signal with a delayed and inverted signal from the rear microphone. In some embodiments, the beam form parameters of microphone 210 can be adjusted based on a contextual state of the user and a device associated with the user. For example, the contextual state of the user can indicate that the user is at work, has been stationary for a period of time, the user's personal computing device is connected to the office's Wi-Fi network, and the processing parameter set is currently set to an ambient sound setting of "Office," which provides a quiet work environment by canceling noises associated with the ambient sound environment. An ambient sound received at external mic 210 can include the user's name. An ambient audio stream 222 is provided to a personal computing device via network 295. The personal computing device is configured to determine that the ambient audio stream includes the user's name. Based on the ambient audio stream including the user's name and the contextual state of the user, the personal computing device can turn on beam forming so that when the user turns his or her ear to the speaker, the user can selectively hear the speaker. The personal computing device can determine beam forming parameters associated with microphone 210 that allows directional focus in a direction of the speaker and can provide active acoustic filter 200 with a command that causes the microphone 210 to modify the beam form parameters to have directional focus in the direction of the speaker. This allows the user to converse with the speaker without having to manually change the ambient sound setting associated with the personal audio system or removing the active acoustic filters from the user's ears.

Microphone 210 is comprised of one or more transducers for converting sound into an electrical signal that is sufficiently compact for use within the housing 290. Preamplifier 215 is configured to amplify the electrical signal output from microphone 210 to a level compatible with the input of A/D converter 220. Preamplifier 215 may be integrated into A/D converter 220, which, in turn, may be integrated with processor 230. In the situation where the active acoustic filter 200 contains more than one microphone, a separate preamplifier may be provided for each microphone.

A/D converter 220 is configured to digitize the output from preamplifier 215, which is to say it converts the output from preamplifier 215 into a series of digital ambient audio samples at a rate at least twice the highest frequency present in the ambient sound. For example, the A/D converter may output ambient audio stream 222 in the form of sequential audio samples at rate of 40 kHz or higher. The resolution of ambient audio stream 222 (i.e., the number of bits in each audio sample) may be sufficient to minimize or avoid audible sampling noise in personal sound 255. For example, A/D converter 220 may output an ambient audio stream 222 having 12 or more bits of amplitude resolution. In the situation where active acoustic filter 200 contains more than one microphone with respective preamplifiers, the outputs from the preamplifiers may be digitized separately, or the outputs of some or all of the preamplifiers may be combined prior to digitization.

Wireless interface 225 is configured to provide digital acoustic filter 200 with a connection to one or more wireless networks 295 using a limited-range wireless communications protocol such as Bluetooth®, WiFi®, ZigBee®, or other wireless personal area network protocol. Wireless interface 225 may be used to receive data such as parameters for use by processor 230 in processing ambient audio stream 222 to produce personal audio stream 232. Wireless interface 225 may be used to receive a secondary audio feed. Wireless interface 225 may be used to export ambient audio stream 232, which is to say transmit ambient audio stream 232 to a device external to active acoustic filter 200, such as a personal computing device. The external device may then, for example, determine a context of the personal audio system and determine one or more actions a user of the personal audio system would most likely want to be performed with respect to or by personal audio system, such as determining a set of audio processing parameters that change the manner in which a user experiences his or her ambient sound environment, determining an action to perform with respect to a personal audio system, and/or determining a notification to provide to the user of the personal audio system.

Processor 230 includes one or more processor devices such as a microcontroller, a microprocessor, and/or a digital signal processor. Processor 230 can include and/or be coupled to memory 235. Memory 235 may store software programs, which may include an operating system, for execution by processor 230. Memory 235 may also store data for use by processor 230. The data stored in memory 235 may include, for example, digital sound samples and intermediate results of processes performed on ambient audio stream 222. The data stored in memory 235 may also include a user's listening preferences, and/or rules and parameters for applying particular processes to convert ambient audio stream 222 into personal audio stream 232. Memory 235 may include a combination of read-only memory, flash memory, and static or dynamic random access memory. In some embodiments, processor 230 is configured to implement the CAHOE.

D/A converter 240 is configured to convert personal audio stream 232 from processor 230 into an analog signal. Processor 230 is configured to output the personal audio stream 232 as a series of samples typically, but not necessarily, at the same rate as ambient audio stream 222 is generated by A/D converter 220. The analog signal output from D/A converter 240 is amplified by amplifier 245 and converted into personal sound 255 by speaker 250. Amplifier 245 may be integrated into D/A converter 240, which, in turn, may be integrated with processor 230. Speaker 250 can be any transducer for converting an electrical signal into sound that is suitably sized for use within housing 290.

A battery or other power supply (not shown) is configured to provide power to various elements of active acoustic filter 200. The battery may be, for example, a zinc-air battery, a lithium ion battery, a lithium polymer battery, a nickel cadmium battery, or a battery using some other technology.

The depiction in FIG. 2 of active acoustic filter 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of analog-to-digital (A/D) converter 220, processor 230, memory 235, analog signal by digital-to-analog (D/A) converter 240, amplifier 245, and wireless interface 225 may be contained within a common signal processor circuit device.

Figure 3:
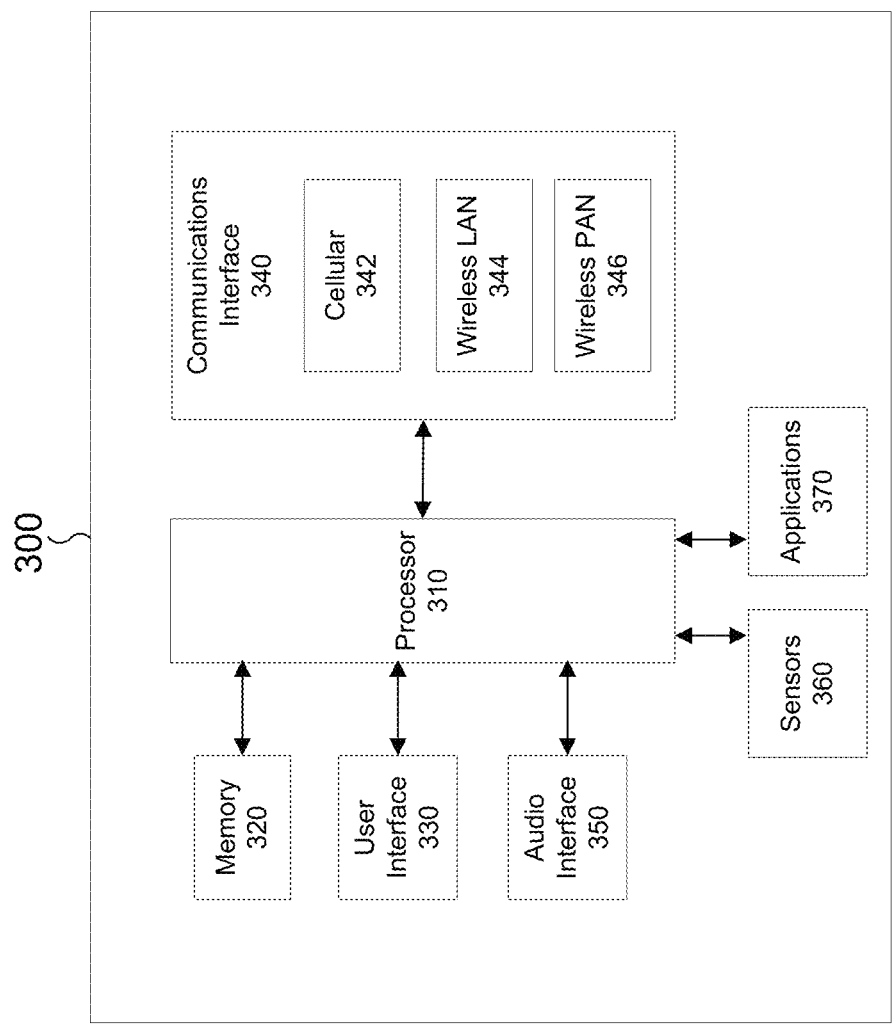
FIG. 3 is a block diagram of an embodiment of a personal computing device.

FIG. 3 is a block diagram of an embodiment of a personal computing device 300, which may be the personal computing device 120. In the example shown, personal computing device 300 can include a processor 310, memory 320, a user interface 330, a communications interface 340, an audio interface 350, one or more sensors 360, and one or more installed applications 370. Some of these elements may or might not be present, depending on the implementation. Further, although these elements are shown independently of one another, each may, in some cases, be integrated into another.

Processor 310 is configured to implement CAHOE. Processor 310 is configured to receive an ambient audio stream from an active acoustic filter, such as active acoustic filter 200. Based on the ambient audio stream and a combination of the contextual information from sensors 360, contextual information from applications 370, one or more local contextual states stored in memory 320, and/or one or more global contextual states stored in memory 320, processor 310 can determine one or more actions a user of the personal audio system 140 would most likely want to be performed with respect to or by a personal audio system. For example, the one or more actions can include selecting a set of audio processing parameters that change the manner in which a user experiences his or her ambient sound environment, determining an action to perform with respect to the personal computing device or the active acoustic filters, and/or determining a notification to provide to the user of personal audio system 140 via user interface 330, audio interface 350, and/or active acoustic filters. In some embodiments, the selected set of audio processing parameters, the action to perform with respect to active acoustic filters, and/or the notification are provided to the active acoustic filters via communication interface 340. Processor 310 may be or include one or more microprocessors, microcontrollers, digital signal processors, application specific integrated circuits (ASICs), or a system-on-a-chip (SOCs).

Memory 320 is configured to store local contextual data and/or global contextual data. Local contextual data can be received from the active acoustic filter via communications interface 340, user interface 330, audio interface 350, sensors 360, and/or applications 370. Global contextual data can be received from a knowledgebase, such as knowledgebase 150, via communications interface 340 or received from another personal audio system via communications interface 340. Memory 320 can include a combination of volatile and/or nonvolatile memory including read-only memory (ROM), static, dynamic, and/or magnetoresistive random access memory (SRAM, DRM, MRAM, respectively), and nonvolatile writable memory such as flash memory.

Memory 320 is configured to store software programs and routines for execution by the processor. These stored software programs may include an operating system such as the Apple® MacOS or IOS operating systems or the Android® operating system. The operating system may include functions to support communications interface 340, such as protocol stacks, coding/decoding, compression/decompression, and encryption/decryption. The stored software programs may include an application or "app" to cause the personal computing device to perform portions of the processes and functions described herein.

User interface 330 includes a display and one or more input devices such as a touch screen. User interface 330 may receive one or more inputs from a user. For example, user interface 330 may receive an input that indicates a determined activity is correct or incorrect, one or more adjustments of audio processing parameters, and/or one or more inputs associated with an applications installed on personal computing device 300. In some embodiments, user interface 330 may receive one or more inputs from a user that adjusts one or more audio processing parameters after processor 310 selects a set of audio processing parameters that change the manner in which a user experiences his or her ambient sound environment and an associated active acoustic filter implements the set of audio processing parameters. In some embodiments, user interface 330 may receive one or inputs from a user that indicates the user wishes to augment the ambient sound by amplification of certain frequencies, combine the ambient sound with a secondary audio feed, equalization (modifying ambient sound by adjusting the relative loudness of various frequencies), echo cancellation, or adding echo or reverberation.

Communications interface 340 is configured to transmit local contextual state stored in memory 320 to an external device. Communications interface 340 can receive global contextual state associated with one or more other users of personal audio systems. Communications interface 340 includes at least one interface for wireless communication with external devices. Communications interface 340 may include one or more of a cellular telephone network interface 342, a wireless local area network (LAN) interface 344, and/or a wireless personal area network (PAN) interface 336. Cellular telephone network interface 342 may use one or more cellular data protocols. Wireless LAN interface 344 may use the WiFi® wireless communication protocol or another wireless local area network protocol. Wireless PAN interface 346 may use a limited-range wireless communication protocol such as Bluetooth®, Wi-Fi®, ZigBee®, or some other public or proprietary wireless personal area network protocol. When personal computing device 300 is deployed as part of a personal audio system, such as the personal audio system 140, wireless PAN interface 346 may be used to communicate with active acoustic filter devices 110L, 110R. Cellular telephone network interface 342 and/or the wireless LAN interface 344 may be used to communicate with cloud 130.

Communications interface 340 includes radio-frequency circuits, analog circuits, digital circuits, one or more antennas, and other hardware, firmware, and software necessary for communicating with external devices. Communications interface 340 may include one or more processors to perform functions such as coding/decoding, compression/decompression, and encryption/decryption as necessary for communicating with external devices using selected communications protocols. Communications interface 340 may rely on processor 310 to perform some or all of these function in whole or in part.

Audio interface 350 is configured to both input and output sound. Audio interface 350 may include more or more microphones, preamplifiers and A/D converters that perform similar functions as the microphone 210, preamplifier 215 and A/D converter 220 of the active acoustic filter 200. Audio interface 350 may include more or more D/A converters, amplifiers, and speakers that perform similar functions as D/A converter 240, amplifier 245 and speaker 250 of the active acoustic filter 200.

Sensors 360 are configured to measure one or more values associated with the personal computing device 300 and to provide the one or more values to processor 310. The various sensors of the personal audio system may include an accelerometer that measures the accelerations associated with the personal audio system, a temperature sensor that measures the temperature associated with the personal audio system, a gyroscope that measures an orientation associated with the personal audio system, a light sensor that measures the brightness of the ambient light associated with the personal audio system, a barometer to measure an atmospheric pressure associated with the personal audio system, an air humidity sensor to measure a humidity level associated with the personal audio system, a heart rate monitor to measure the heart rate of a user associated with the personal audio system, or any other type of sensor that measures a value associated with the personal audio system. Personal computing device 300 may also be configured to perform geo-location, which is to say to determine its own location. Geo-location may be performed, for example, using a Global Positioning System (GPS) receiver or by some other method.

One or more applications 370 are installed on personal computing device 300. One or more applications 370 may be configured to provide contextual information to processor 310. One or more applications 370 may be configured to perform an action in response to receiving a command from processor 310. For example, processor 310 may determine a music application should play music or pause music being played based on an ambient audio stream and a combination of the contextual information from sensors 360, contextual information from applications 370, one or more local contextual states stored in memory 320, and/or one or more global contextual states stored in memory 320. Processor 310 may also determine a navigation application should adjust a manner in which directions are provided (e.g., overlay on top of music being outputted from another application, interrupt music being outputted from another application, or provide only visual directions) based on an ambient audio stream and a combination of the contextual information from sensors 360, contextual information from applications 370, one or more local contextual states stored in memory 320, and/or one or more global contextual states stored in memory 320.

Figure 4:
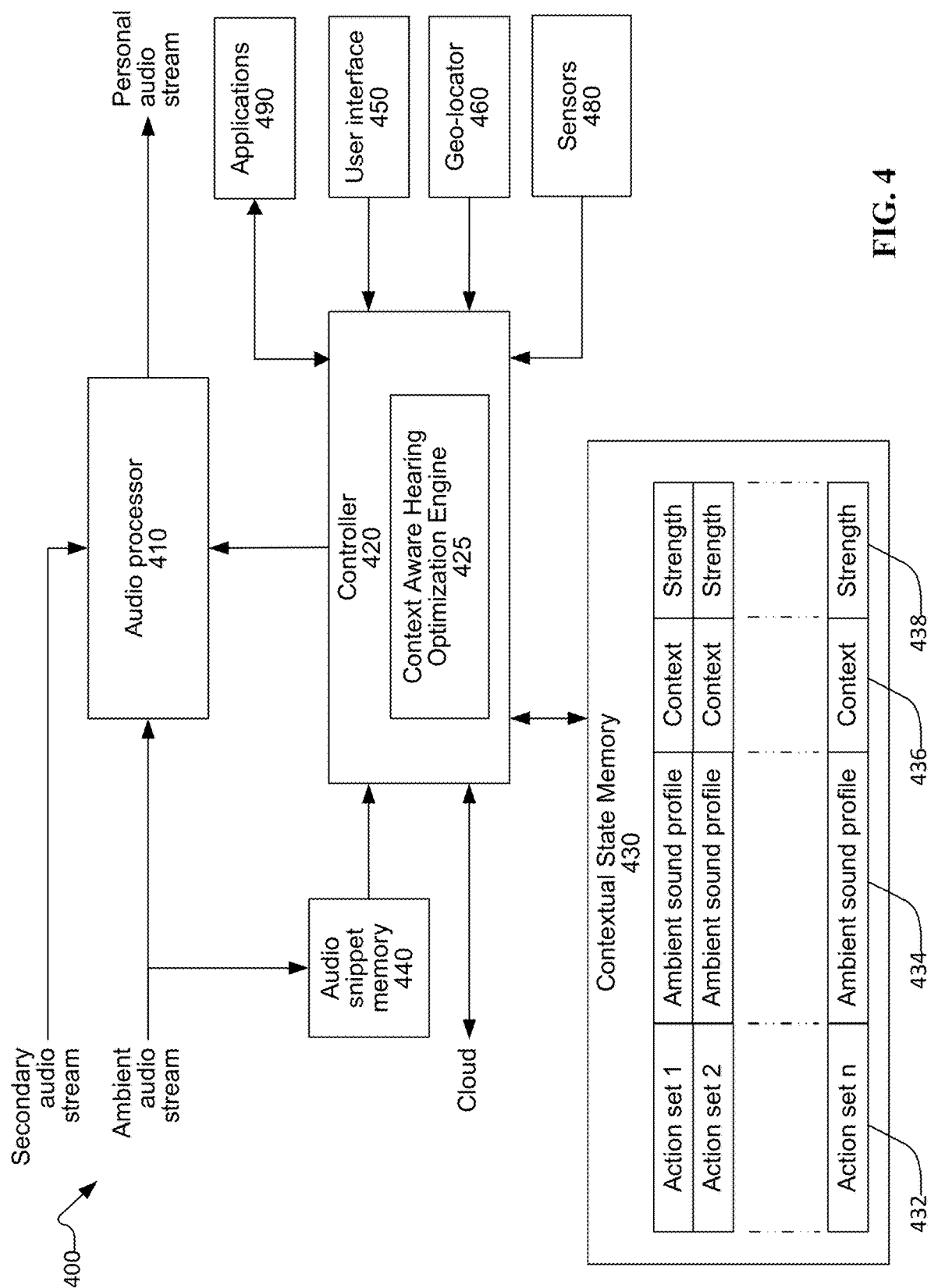
FIG. 4 is a block diagram illustrating an embodiment of a system for implementing a context aware hearing optimization engine.

FIG. 4 is a block diagram illustrating an embodiment of a system for implementing a context aware hearing optimization engine. This process may be implemented on a personal audio system, such as personal audio system 140. Personal audio system 400 includes one or two active acoustic filters, such as active acoustic filters 110L, 110R, and a personal computing device, such as personal computing device 120. The functional blocks shown in FIG. 4 can be implemented in hardware, by software running on one or more processors, or by a combination of hardware and software. The functional blocks shown in FIG. 4 can be implemented within the personal computing device, or within one or both active acoustic filters, or may be distributed between the personal computing device and the active acoustic filters.

In the example shown, personal audio system 400 includes an audio processor 410, a controller 420, a contextual state memory 430, an audio snippet memory 440, a user interface 450, a geo-locator 460, sensors 480, and applications 490. Audio processor 410 and/or the controller 420 may include their own memory, which is not shown, for storing program instructions, intermediate results, and other data.

Audio processor 410 includes one or more microprocessors, microcontrollers, digital signal processors, application specific integrated circuits (ASICs), or a system-on-a-chip (SOCs). Audio processor 410 can be located within an active acoustic filter, within the personal computing device, or may be distributed between a personal computing device and one or two active acoustic filters.

Audio processor 410 is configured to receive and process an ambient audio stream, such as ambient audio stream 222, to provide a personal audio stream, such as personal audio stream 232. Audio processor 410 can perform processes including filtering, equalization, compression, limiting, and/or other processes. Filtering may include high-pass, low-pass, band-pass, and band-reject filtering. Equalization may include dividing the ambient sound into a plurality of frequency bands and subjecting each of the bands to a respective attenuation or gain. Equalization may be combined with filtering, such as a narrow band-reject filter to suppress a particular objectionable component of the ambient sound. Compression may be used to alter the dynamic range of the ambient sound such that louder sounds are attenuated more than softer sounds. Compression may be combined with filtering or with equalization such that frequency bands with louder ambient sound are attenuated more than frequency bands with softer ambient sound. Limiting may be used to attenuate louder sounds to a predetermined loudness level without attenuating softer sounds. Limiting may be combined with filtering or with equalization such that frequency bands with louder ambient sound are attenuated to a defined level while frequency bands with softer ambient sound are not attenuated or attenuated by a smaller amount.

Audio processor 410 can also add echo or reverberation to the ambient audio stream. Audio processor 410 may also detect and cancel an echo in the ambient audio stream and perform noise reduction processing.

Audio processor 410 can receive a secondary audio stream. For example, the secondary audio stream may be audio from an application running on the personal computing device (e.g. directions from a navigation app, music from a streaming music app, information from a self-guided audio tour app), a secondary audio feed of a sportscaster describing a sporting event that the user is attending, a secondary audio feed from tour guide describing a place of interest that the user is visiting, music stored on the personal computing device, or an audio notification from the personal computing device. Audio processor 410 may incorporate the secondary audio stream into the personal audio stream. The secondary audio stream may be added to the ambient audio stream before processing, after all processing of the ambient audio stream is performed, or at an intermediate stage in the processing of the ambient audio stream. The secondary audio stream might not be processed, or may be processed in the same manner as or in a different manner than the ambient audio stream.

Audio processor 410 is configured to process the ambient audio stream, and optionally the secondary audio stream, in accordance with a processing parameter set. The processing parameter set may define the type and degree of one or more processes to be performed on the ambient audio stream and, when desired, the secondary audio stream. The processing parameter set may include numerical parameters, filter models, software instructions, and other information and data to cause the audio processor to perform desired processes on the ambient audio stream. The extent and format of the information and data within active processing parameter set may vary depending on the type of processing to be performed. For example, the processing parameter set may define filtering by a low pass filter with a particular cut-off frequency (the frequency at which the filter start to attenuate) and slope (the rate of change of attenuation with frequency) and/or compression using a particular function (e.g. logarithmic). For further example, the processing parameter set may define the plurality of frequency bands for equalization and provide a respective attenuation or gain for each frequency band. In yet another example, the processing parameters may define a delay time and relative amplitude of an echo to be added to the digitized ambient sound.

Audio processor 410 may receive the action set from the controller 420. A context aware hearing optimization engine 425 may determine the action set based on one or more inputs received at controller 420. The one or more inputs are provided to CAHOE 425.

The one or more inputs can include a most recent audio snippet stored in audio snippet memory 440, user inputs received via user interface 450, location data determined by a geo-locator 460, sensor data provided by various sensors 480 of the personal audio system, application data provided by one or more applications 490 of the personal audio system, and time information provided by an internal clock (not shown) of personal audio system, and/or a combination of one or more contextual states stored in contextual state memory 430.

The personal audio system includes an audio snippet memory 440. Audio snippet memory 440 may be, for example, a revolving or circular buffer memory having a fixed size where the newest data overwrites the oldest data such that, at any given instant, the buffer memory contains a predetermined amount of the most recently stored data. The audio snippet memory 440 may store, for example, the most recent audio stream data for a period of 2 seconds, 5 seconds, 10 seconds, 30 seconds, or some other period. Audio snippet memory 440 may store a "most recent portion" of an audio stream, where the "most recent portion" is the time period immediately preceding the current time. Audio snippet memory 440 may store an ambient audio stream of an active acoustic filter or an audio stream derived from an audio interface of a personal computing device. Audio snippet memory can be located within one or more both of the active acoustic filters or a personal computing device. In either case, the duration of the most recent portion of the audio stream stored in the audio snippet memory 440 may be sufficient to capture very low frequency variations in the ambient sound such as, for example, periodic frequency modulation of a siren or interruptions in a baby's crying when the baby inhales.

The various sensors 480 of the personal audio system may include an accelerometer that measures the accelerations associated with the personal audio system, a temperature sensor that measures the temperature associated with the personal audio system, a gyroscope that measures an orientation associated with the personal audio system, a light sensor that measures the brightness of the ambient light associated with the personal audio system, a barometer to measure an atmospheric pressure associated with the personal audio system, an air humidity sensor to measure a humidity level associated with the personal audio system, a heart rate monitor to measure the heart rate of a user associated with the personal audio system, or any other type of sensor that measures a value associated with the personal audio system. The values associated with sensors 480 are provided to controller 420.

One or more inputs may be received via user interface 450 and provided to controller 420. In some embodiments, user interface 450 may receive one or more inputs from a user that adjusts one or more audio processing parameters after CAHOE 425 selects a set of audio processing parameters that change the manner in which a user experiences his or her ambient sound environment and an associated active acoustic filter implements the set of audio processing parameters. In some embodiments, user interface 450 may receive one or inputs from a user that indicates the user wishes to augment the ambient sound by amplification of certain frequencies, combine the ambient sound with a secondary audio feed, equalization (modifying ambient sound by adjusting the relative loudness of various frequencies), echo cancellation, or adding echo or reverberation. In some embodiments, user 450 may receive one or more inputs from a user that verifies the identification of a user activity or a location of the user.

Personal audio system 400 can include a geo-locator 460. The geo-locator 460 determines a geographic location of the personal audio system 400 using GPS, cell tower triangulation, or some other method. In some embodiments, controller 420 may compare the geographic location of the personal audio system 400, as determined by the geo-location 460, with location information stored in contextual state memory 430.

Personal audio system 400 can include an internal clock. The one or more inputs provided to controller 420 can be timestamped and stored in contextual state memory 430 in association with the timestamp.

One or more contextual states are provided to controller 420. A contextual state is comprised of an action set 432 and associated indicators, i.e., ambient sound profile 434, context information 436, and strength of recommendation 438.

The contextual state memory 430 may store a plurality of contextual states (e.g. tens, hundreds, thousands, ten-thousands, etc.).

Action set 432 is comprised of one or more actions to perform based on a context of the personal audio system. Action set 432 includes one or more processing parameter sets that are used to process an ambient sound stream, an action to perform with respect to or by the personal audio system, a notification to provide to a user of the personal audio system, or a combination thereof. In some embodiments, the one or more processing parameter sets that are used to process an ambient sound stream can adjust the manner in which an ambient sound environment is heard by a user of the personal audio system.

In some embodiments, the action to perform with respect to or by the personal audio system can include a command to turn on beam forming, a command to adjust beam forming parameters associated with a microphone of an active acoustic filter, a command to provide a secondary audio stream (e.g., news, music, podcast, etc.), a command to order a good or service (e.g., a cup of coffee, a car from a ride-sharing application) via an application installed on a personal computing device, a command to add an event or appointment to an electronic calendar associated with a user of the personal audio system, a command to provide a payment for goods or services (e.g., paying for a portion of or an entire dinner bill, paying for a cup of coffee) via an application (e.g., PayPal®, Venmo®, Starbucks®) installed on a personal computing device, etc. In some embodiments, the command includes a voice prompt requesting verification from the user of the personal audio system to perform the command.

In some embodiments, the notification can be a visual notification that is provided via a user interface, an audio notification that is included in a personal audio stream, or a combination of a visual notification and an audio notification. In some embodiments, the notification is provided when an ambient audio steam does not include a speech signal.

The contextual state memory 430 is configured to store dozens or hundreds or an even larger number of action sets 432. Each action set 432 may be associated with at least one indicator, where an "indicator" is data indicating conditions or circumstances where the associated action set 432 is appropriate for selection. The selected action set can be provided to audio processor 410 or applications 490. The indicators associated with each action set 432 may include an ambient sound profile 434, context information 436, and a strength of recommendation 438. In some embodiments, an action set is associated with an ambient sound profile, contextual information, a strength of recommendation, and/or a combination of an ambient sound profile, contextual information, and a strength of recommendation. For example, an ambient sound profile may indicate that the ambient sound environment is similar to an airplane cabin. Different action sets may be appropriate based on the contextual information associated with the ambient sound profile. A first action set associated with an airplane cabin may be selected to reduce the amount of engine noise heard by a user. During a flight, a baby may begin to cry. A second action set associated with an ambient sound environment of an airplane cabin and a crying baby may be selected to reduce the amount of engine noise and baby cries heard by the user. As the baby continues to cry, a flight attendant may approach the user and ask if the user wants a drink. A third action set associated with an ambient sound environment of an airplane cabin, a crying baby, and a flight attendant may be selected to reduce the amount of engine noise and baby cries heard by the user, but allows the user to hear the flight attendant. For example, the third action set may include a command that turns on beam forming and/or causes a microphone of an active acoustic filter, such as microphone 210 of active acoustic filter 200, to modify the beam forming parameters of the microphone to allow directional focus to be in a direction of the flight attendant.

The contextual state stored in contextual state memory 430 can be a local contextual state or a global contextual state. A local contextual state describes a state of the user's personal audio system at a particular moment in time and an associated action to perform with respect to the user's personal audio system. In some embodiments, the local contextual state is stored when a change occurs with respect to a processing parameter set, a change to one or more of the indicators, or in response to a user input received via user interface 450. The local contextual state can be uploaded to a remote server, such as knowledgebase 150, via a communication link, such as communication link 122 or 114.

A global contextual state describes a state of another user's personal audio system at a particular moment in time. The global contextual state is comprised of a processing parameter set and associated indicators, such an ambient sound profile and context information. One or more global contextual states can be downloaded from a remote server, such as knowledgebase 150, by the personal audio system 400 using wireless interface of the active acoustic filters or using the communications interface of the personal computing device. The one or more global contextual states may be downloaded dynamically based upon audio characteristics of ambient audio, as detected by the personal audio system 400, a current (or future) location for the personal audio system 400 as determined by geo-location capabilities within the personal audio system 400 (discussed below), the context in which the personal audio system 400 finds itself (e.g., most-common-used action set of other users with similar contextual information), or based upon current or future time-based data associated with the personal audio system 400 (e.g., an email indicates the user will attend a concert at a particular venue). In some embodiments, when the ambient sound profile and associated context information is not associated with an action set, a global contextual state that matches the ambient sound profile and associated context information can be downloaded. In some embodiments, the global contextual state is an amalgamation of the contextual states of a plurality of other users. For example, the global contextual state can include a processing parameter set that is the average of the processing parameters of the plurality of other users.

A contextual state stored in contextual state memory 430 may include an ambient sound profile 434. Each ambient sound profile 434 of a contextual state defines features and characteristics of an ambient sound environment in which the associated action set 432 is appropriate. Each ambient sound profile 434 may define the features and characteristics of the ambient sound environment by a finite number of numerical values. For example, an ambient profile may include numerical values for some or all of an overall loudness level, a normalized or absolute loudness of predetermined frequency bands, a spectral envelope shape, spectrographic features such as rising or falling pitch, frequencies and normalized or absolute loudness levels of dominant narrow-band sounds, an indicator of the presence or absence of odd and/or even harmonics, a normalized or absolute loudness of noise, a low frequency periodicity (e.g. the "beat" when the ambient sound includes music), and numerical values quantifying other features and/or characteristics.

A contextual state stored in contextual state memory 430 may include context information 436. Context information 436 describes the device and/or user of the device at a particular moment in time and may be associated with an appropriate action set. Context information 436 may include at least one of: location information, time-based data, activity data, device settings, situation data, conversation data, application information and/or sensor data. The appropriate action set may differ based on the context information. In some embodiments, the personal audio system can be located at a particular location, but different action sets may be appropriate for different times of the day. For example, the personal audio system is located at place A in the morning and the evening. Because the ambient sound environment for place A is different in the morning than it is in the evening, the action set associated with place A in the morning may be different than the action set associated with place A in the evening.

An action set 432 can be selected at least in part when the one of the location indicators stored in contextual state memory 430 matches the current location information of the personal audio system 400. Location information can include a specific geographic location that is defined by a geographic position such as, a street address, longitude and latitude coordinates, GPS coordinates, or in some other manner. A geographic position may include fine-grained information such as a floor or room number in a building. Location information can also include a limited geographic area that is defined, for example, by a center point and a radius, by a pair of coordinates identifying diagonal corners of a rectangular area, by a series of coordinates identifying vertices of a polygon, or in some other manner.

An action set 432 can be selected at least in part when the one of the time-based data stored in contextual state memory 430 matches the current time-based data associated with personal audio system 400. Time-based data can be a time signal received from a clock of the device. In situations in which a user habitually performs an action at a known time every weekday or every third Tuesday or other similarly-predictable interval, the present time, noted over the course of multiple occurrences may act as time-based data. Time-based data can also be data that is dependent upon or derived from the present, a past, or a future time. Calendar entries such as appointments, meetings, and previously-scheduled events are examples of time-based data. Similarly, "time-based data" can be obtained from other sources, such as text messages, simple message service messages, instant messaging services, group messaging services, email, and other text-based communications such that, for example, data indicating a plan to meet at a particular location at a pre-determined time may comprise "time-based data." Similarly, data attached to any one of these formats can also be time-based data. For example, an email may include as an attachment e-tickets or tickets in PDF (portable document format) form to an event at a concert venue with date and time information appearing on the face of the tickets. This date and time information is time-based data. Location data, such as GPS (global positioning system) data, or assisted GPS data is specifically excluded from the meaning of "time-based data" as used herein.

An action set 432 can be selected at least in part when the action data stored in contextual state memory 430 matches the current action data of the personal audio system 400. Activity data includes information describing the activity of a user at a particular moment in time. An activity of the user can be determined based on one or more sensors 480 of the personal audio system. For example, the personal computing device can include an accelerometer that outputs acceleration data based on the movement of a user. The output of the accelerometer can match an acceleration profile associated with one or more particular types of activities. An activity of the user can also be determined based on data associated with one or more applications running on a personal computing device. For example, a ride-sharing application (e.g., Uber® or Lyft®) may provide data to the controller via an application programming interface. Based on the application data and geo-location data, the user can be determined to be riding in a vehicle. In some embodiments, feedback is requested via user interface 450 to determine whether the determined activity is correct. In the event the determined activity is incorrect, the user is provided with the ability to input the correct activity. Correct activities, associated context information, and associated processing parameter sets are stored together in memory.

An action set 432 can be selected at least in part when the device settings stored in contextual state memory 430 matches the current device settings of personal audio system 400. Devices settings may describe a state of the personal audio system at a particular moment in time. For example, the device may have the ringer turned off, set to a vibration mode, connected to a particular Wi-fi connection, be in airplane mode, lack a cell phone connection, connected to a particular type of cell phone carrier, connected to a particular device via a wireless connection, such as Bluetooth®, etc. This type of information provides further context as to the device. For example, the personal audio system may be located in a multi-floor building, each floor with a different WI-FI connection. Location data by itself will determine that the device is located in the building, but unable to determine the specific location of the device within the building. For example, a building may include a coffee shop on the first floor and a movie theater on the second floor. The coffee shop is associated with an action set that is different than the movie theater. If the device is connected to a Wi-Fi SSID that is associated with a known location (e.g., a SSID of "Starbucks WiFi" is associated with a Starbucks® coffee shop), then the appropriate action set, i.e., an action set associated with a coffee shop, may be selected.

An action set 432 can be selected at least in part when the situation information stored in contextual state memory 430 matches the current situation information of personal audio system 400. Situation information describes a situation experienced by the device or a user of the device. Examples of situations include "airplane cabin," "dinner," "concert," "subway," "urban street," "siren," and "crying baby." For example, a particular ambient sound profile may indicate that a siren is moving towards the user. A siren can be determined to be moving towards the user based on a Doppler shift where the frequency of the siren moving towards the user is higher than a stationary siren. In some embodiments, the siren can be determined to be moving towards the user based on an amplitude of the siren signal increasing over time. In this situation, an action set can be selected that includes a processing parameter set that allows the user of the personal audio system to better hear his or her surroundings, a command to close an active text messaging application to prevent the user from being distracted, and/or provide an audio warning that an ambulance is approaching, or a combination thereof.

Alternatively, the particular ambient sound profile may indicate the siren is moving away from the user. A siren can be determined to be moving away from the user based on a Doppler shift where the frequency of the siren moving away from the user is lower than a stationary siren. In some embodiments, the siren can be determined to be away from the user based on an amplitude of the siren signal decreasing over time. In this situation, an action set can be selected that includes a processing parameter set that reduces the amount of siren signal heard by the user of the personal audio system.

An action set 432 can be selected at least in part when the conversation data stored in contextual state memory 430 matches the current conversation data of personal audio system 400. Conversation data may include one or more trigger words exchanged during a conversation experienced by the user. Conversation data can be extracted from an ambient audio stream stored in audio snippet memory 440. For example, the ambient audio stream may include the name of the user of the personal audio system. Based at least in part on the ambient audio stream including the user's name, an action set can be selected that turns on beam forming and causes beam form parameters associated with microphone 210 to be adjusted to allow directional focus in a direction of the speaker. The ambient audio stream may include the appointment information (e.g., "Let's meet tomorrow at 5 pm."). Based at least in part on the ambient audio stream including appointment information, an action set can be selected that causes an appointment or event to be added to an electronic calendar associated with a user of the personal audio system.

An action set 432 can be selected at least in part when the sensor data stored in contextual state memory 430 matches the current sensor data of personal audio system 400. Sensor data includes data obtained from sensors 480 that are associated with the device at a particular moment in time. The sensor data can provide more contextual information to ensure that a correct processing parameter set is selected, a correct action to perform with respect to a personal audio system is selected, and/or a correct notification is selected to provide to the user. For example, a temperature sensor may measure the temperature associated with an environment of the personal audio system. Depending upon the temperature, a user may decide to either walk home or catch a ride. To prevent the selection of an incorrect action set, the sensor data can provide additional contextual information that allows the system ask the user via active acoustic filters whether to order a cab via ride-sharing app without the user ordering the cab via a user interface of the personal computing device.

An action set 432 can be selected based at least in part on a strength of recommendation 438 associated with the action set. In some embodiments, an action set is selected if the associated strength of recommendation is equal to or above a recommendation threshold. In the event the associated strength of recommendation is below the recommendation threshold, then the action set is not selected. In other embodiments, two or more action sets can have an associated strength of recommendation that is equal to or above a recommendation threshold. In the event two or more action sets have an associated strength of recommendation that is equal to or above the recommendation threshold, the action set with a higher strength of recommendation is selected.

The one or more inputs are provided to CAHOE 425, which determines an appropriate action set 432. CAHOE 425 is comprised of a hierarchical machine learning environment. CAHOE is configured to use machine learning techniques such as neural nets, fuzzy logic, adaptive neurofuzzy inference systems, or combination of these and other machine learning methodologies to update the action sets.

A first hierarchical level of CAHOE 425 is comprised of a plurality of machine learning models, each trained to determine whether an ambient audio stream stored in audio snippet memory 440 includes a particular characteristic. For example, a machine learning model of the first hierarchical level may be configured to determine if the ambient audio stream matches a particular ambient sound profile, if the ambient audio stream includes particular feature data, if the ambient audio stream includes speech, if a particular a gender is speaking, or if a particular word or phrase was said in the ambient audio stream. A machine learning model outputs a confidence score that indicates whether the ambient audio stream includes the particular characteristic to which the machine learning model is trained. The machine learning model can be trained with a set of positive audio samples that include the specific type of audio signal and a set of negative audio samples that do not include the specific type of audio signal. Any number of positive audio samples and negative audio samples may be used to train the machine learning model. The positive and negative audio samples are applied to train the machine learning model. Machine learning techniques can be applied to learn new types of audio from the audio samples. These analytical techniques can include, for example, numerical and statistical analysis of the audio samples and semantic analysis of context information.

A second hierarchical level of CAHOE 425 is comprised of a machine learning model that is trained to determine the real characteristics of the ambient sound stream. Based on various inputs and confidence scores, the machine learning model may determine the real characteristics of the ambient sound stream. The second hierarchical level of CAHOE 425 is comprised of a machine learning model that determines the real characteristics of the ambient sound environment experienced by the user. In some embodiments, the machine learning models may be further refined by receiving user feedback that indicates whether the machine learning model correctly identified a particular source of a sound contained within the ambient audio stream. A third hierarchical level of CAHOE 425 is comprised of a machine learning model that is trained to determine an action set to be selected based on the real characteristics of the ambient audio stream and one or more indicators that include an ambient sound profile, context information, and/or a strength of recommendation.

The controller 420 may select an action set 432 and cause one or more actions associated with the action set to be performed.

Figure 5:
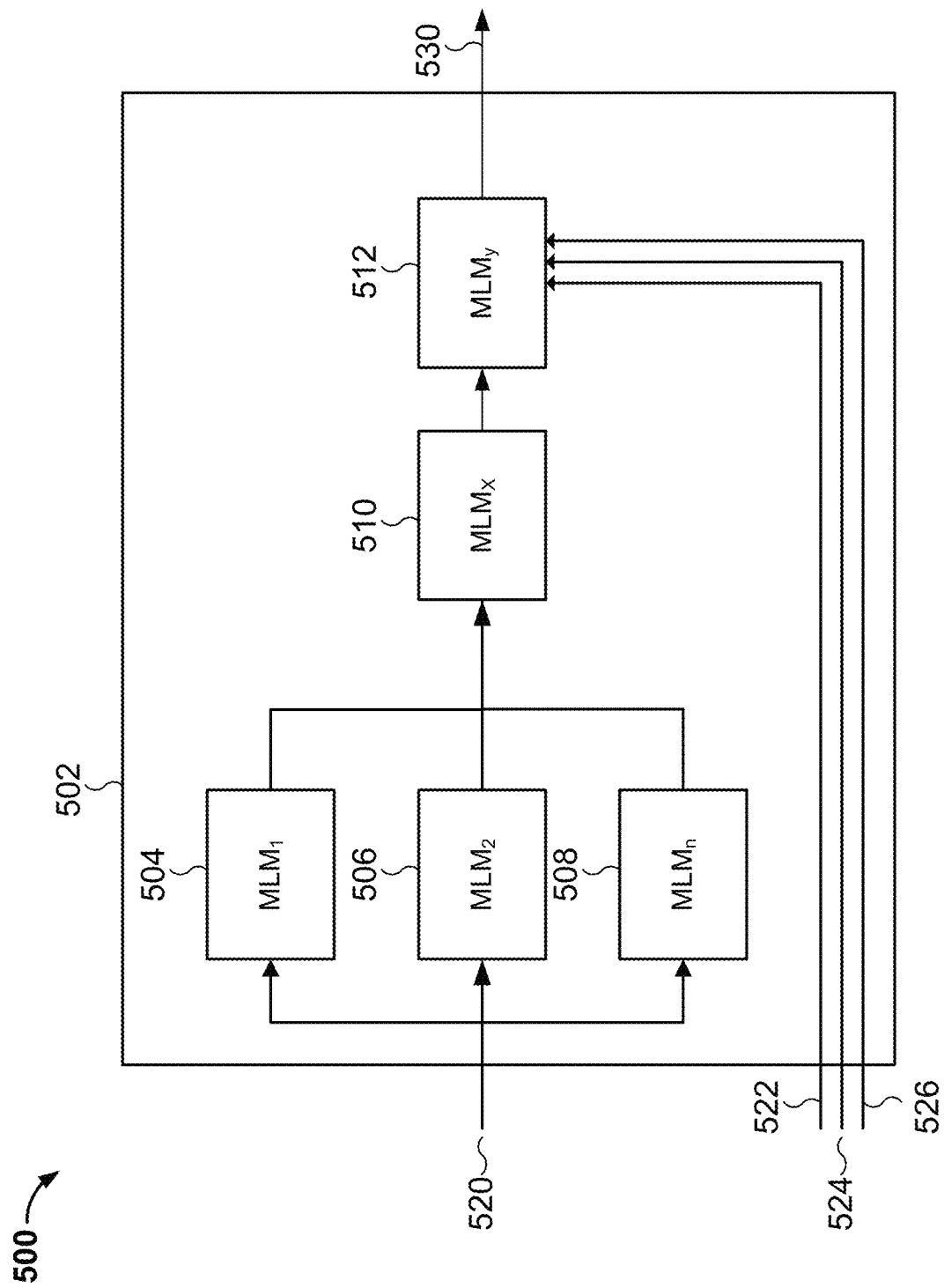
FIG. 5 is a block diagram illustrating an embodiment of a context aware hearing optimization engine.

FIG. 5 is a block diagram illustrating an embodiment of a CAHOE. The system 500 can implemented by a processor, such as processor 230 or processor 310. In other embodiments, the system 500 is implemented in a system running in the cloud, such as knowledgebase 150.

In the example shown, the system 500 includes a CAHOE 502 that includes a plurality of machine learning models (e.g., deep neural networks, other types of neural networks, support vector machine, decision tree learning, clustering, Bayesian, etc.). CAHOE 502 includes a first hierarchical level of machine learning models comprised of machine learning model 504, machine learning model 506, and machine learning model 508. Although the example depicts the first hierarchical level having three machine learning models, the first hierarchical level can have n number of machine learning models. The machine learning models are trained offline in the cloud, for example, at knowledgebase 150, and deployed to a device via a communications link, such as communications link 122 or 114.

Machine learning models 504, 506, 508 can be trained to determine whether an input ambient audio stream 520 includes a particular characteristic, such as if the ambient audio stream matches a particular ambient sound profile, if the ambient audio stream includes a particular sound source, if the ambient audio stream includes speech, if a particular a gender is speaking, or if a particular word or phrase was said in the ambient audio stream. For example, machine learning model 504 may be trained to determine whether input ambient audio stream 520 includes a siren, machine learning model 506 may be trained to determine whether input ambient audio stream 520 includes speech, and machine learning model 508 may be trained to determine whether input ambient audio stream 520 includes a female or male speaker. The machine learning models can be trained to determine whether input ambient audio stream 520 includes other types of sounds, e.g., baby crying, engine noise, siren, etc. The machine learning models 504, 506, 508 are trained using ambient sound streams from all users associated with an active acoustic filter.

Machine learning model 504, 506, 508 can be trained to determine whether an input ambient audio signal 520 matches a particular ambient sound profile. An ambient sound profile may define the features and characteristics of the ambient sound environment by a finite number of numerical values. For example, an ambient profile may include numerical values for some or all of an overall loudness level, a normalized or absolute loudness of predetermined frequency bands, a spectral envelope shape, spectrographic features such as rising or falling pitch, frequencies and normalized or absolute loudness levels of dominant narrow-band sounds, an indicator of the presence or absence of odd and/or even harmonics, a normalized or absolute loudness of noise, a low frequency periodicity (e.g. the "beat" when the ambient sound includes music), and numerical values quantifying other features and/or characteristics.

Machine learning models 504, 506, 508 can be trained to determine whether an input ambient audio stream 520 includes one or more trigger words. For example, a machine learning model can be trained to determine whether input ambient audio signal 520 includes the words "lunch," "appointment," "stop," etc. In some embodiments, a machine learning model is trained to determine whether an input ambient audio stream 520 includes one or more trigger words specific to the user. For example, a machine learning model can be trained to determine whether input ambient audio signal 520 includes a name of the user, a name of a relative of the user, a name of a friend of the user, a name of the user's employer, etc.

In some embodiments, the machine learning models are trained in a two-step process, based on a stacked denoising autoencoder architecture. The first step is unsupervised, and at each layer, the model is asked to recreate its input. The input is modified (e.g., by pitch shifting or dropping out bits of data) so that the model is forced to deal with dirty data. Subsequently, the second step is a supervised step where labeled audio samples are passed through the model and the model is judged based on how well it is able to classify each sound.

Machine learning models 504, 506, 508 are configured to each output a confidence score that indicates a confidence level that the input ambient audio stream 520 includes the particular characteristic, i.e., type of sound, sound profile, or one or more trigger words, to which the machine learning model is trained. The confidence scores are a representation of the ambient sound environment of the user. For example, machine learning model 504 may output a value of 0.8, which indicates that machine learning model 504 is 80% confident that input ambient audio stream 520 includes a siren. Machine learning model 506 may output a value of 0.2, which indicates that machine learning model 506 is 20% confident that input ambient audio stream 520 includes speech. Machine learning model 508 may output a value of 0.5, which indicates that machine learning model 508 is 50% confident that input ambient audio stream 520 includes a female voice.

Machine learning model 510 is configured to receive the confidence scores from each of the machine learning models 504, 506, 508 and to determine the real characteristics of ambient audio stream 520. Machine learning model 510 can determine the actual sounds that are part of ambient audio stream 520. For example, ambient audio stream 520 may include an audio signal of a siren, which may have characteristics similar to that of an audio signal of a female voice. In the above example, machine learning model 510 has received a 80% confidence score from machine learning model 504 that ambient audio stream 520 includes a siren and a 50% confidence score from machine learning model 508 that ambient audio stream 520 includes a female voice. However, machine learning model 520 has also received a 20% confidence score from machine learning model 506 that ambient audio stream 520 does not include a speech signal. Based on the combination of the confidence scores, machine learning model 510 can output data that indicates the real characteristics of the ambient audio stream.

Machine learning model 510 can be trained with sets of different confidence scores that indicate whether an ambient audio stream includes a particular audio characteristic. Machine learning model 510 can be trained with a set of positive results with confidence scores that indicate the ambient audio stream includes a particular type of audio characteristic and a set of negative results with confidence scores that indicate that the ambient audio stream does not include a particular type of audio characteristic. A confidence score can have a value between 0 and 1 and is considered to be a positive result if the confidence score is equal to or above a threshold value and a negative result if the confidence score is below a threshold value.

The set of positive results can include 1 to n number of confidence scores associated with a particular characteristic of an ambient audio stream. The set of negative results can include 1 to n number of confidence scores that indicate a particular characteristic that is not included in an ambient audio stream. A set of confidence scores can include any number and any combination of positive results and negative results and any number of confidence score sets may be used to train machine learning model 510.

Machine learning model 512 is configured to receive the output data from machine learning model 510, and a combination of current contextual state 522, one or more stored local contextual states 524, and/or one or more stored global contextual states 526. Machine learning model 512 can select an action to perform with respect to the personal audio system based in part on the output data from machine learning model 510, and a combination of current contextual state 522, one or more stored local contextual states 524, and one or more stored global contextual states 526 and output the selected action to perform. Current contextual state 522 can include at least one of: location information, time-based data, activity data, device settings, situation data, conversation data, application information and/or sensor data. Stored local contextual state 524 can describe a previous state of the user and the user's associated device, an action the user would most likely want to perform with respect to or by the user's associated device, and a strength of recommendation associated with the action. For example, the user's ambient sound environment, location, activity, device settings, time-based information, etc. can be associated with an action set that determines an action to perform with respect to the user's associated device. Global contextual state 524 is comprised of an action set and associated indicators describe the environment of one or more other users. Similar to the user's local contextual state, the global contextual state can provide contextual information regarding the environment of one or more other users in situations that are similar to the user and actions sets that were selected based on the global contextual information.

For example, the output of machine learning model 510 indicates that the user is brushing his or her teeth. The one or more non-audio context processing parameters indicate that the user is at home in the morning, the current traffic conditions, and that historically, the user orders a ride via a ride-sharing application (e.g., Uber®, Lyft® on the phone around this particular time in the morning. Global contextual state indicates that other users have ordered a ride via a ride-sharing application under similar context. Machine learning model 512 can output a command that asks the user via the audio acoustic filters whether he or she wants to order a ride via the ride-sharing application. The user can respond with a voice command to order the ride via the ride-sharing application.

Machine learning model 512 can be trained with different combinations of real characteristics, current contextual state 522, one or more local contextual states 524, and/or one or more global contextual states 526. Machine learning model 512 can be trained with a set of positive combinations that indicate a particular action set should be selected and a set of negative combinations that indicate a particular action set should not be selected. Any number of positive combinations and any number of negative combinations can be used to train machine learning model 510. In some embodiments, machine learning model 512 is trained to determine an action to select that is specific to the user. For example, machine learning model 512 can be trained such that when an ambient audio stream includes the name of the user, the determined selected action causes beam forming to be turned on and one or more beam forming parameters associated with a microphone to be adjusted.

Figure 6:
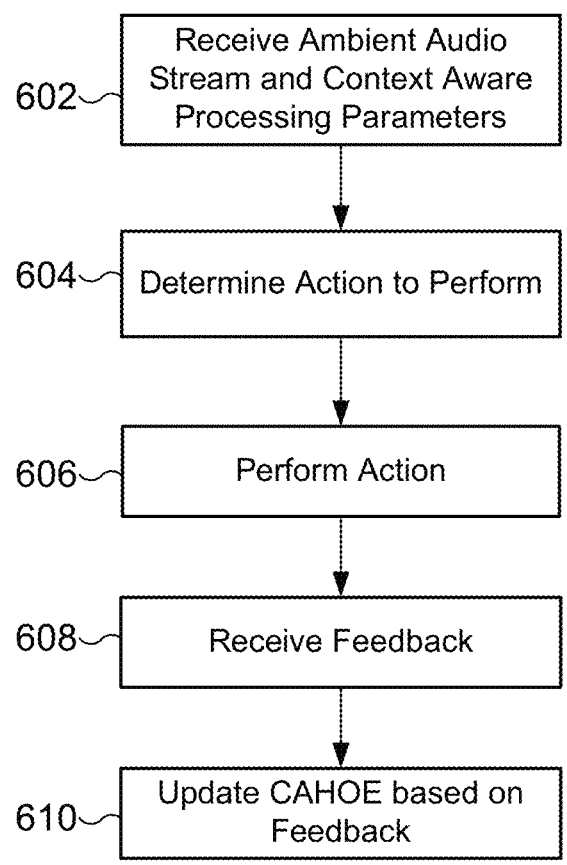
FIG. 6 is a flow chart illustrating an embodiment of a process for implementing a context aware hearing optimization engine.

FIG. 6 is a flow chart illustrating an embodiment of a process for implementing a CAHOE. In the example shown, the process 600 can be implemented by processor 230 or processor 310.

At 602, ambient audio stream and one or more context aware processing parameters are received. The ambient audio stream may be received from an audio snippet memory. The one or more context aware processing parameters can include current contextual state, one or more stored local contextual states, and/or one or more stored global contextual states. The current contextual state may be determined based upon one or more user inputs received via a user interface, location data determined by a geo-locator, sensor data provided by one or more sensors, application data provided by one or more applications, and time information provided by an internal clock of the system. The stored local contextual state associates previous contextual state of the user and the user's device with an action set. The stored global contextual state associates previous contextual state of other users and the other users' device with an action set.

At 604, one or more actions to perform based on the ambient audio stream and the one or more context aware processing parameters are determined. The ambient audio stream and the context aware processing parameters are provided to a CAHOE. The CAHOE is comprised of a hierarchical machine learning environment that can determine one or more actions to perform with respect to the device based on one or more local contextual states and/or one or more global contextual states. The first hierarchical level of the hierarchical machine learning environment is comprised of a plurality of machine learning models. Each machine learning model of the first hierarchical level has been trained to identify different characteristics of the ambient audio stream, such as whether the ambient audio stream matches a known ambient sound profile, includes a particular type of audio signal, or includes one or more trigger words. Each of the machine learning models of the first hierarchical level outputs a confidence value that indicates whether the ambient audio stream includes the characteristic to which the machine learning model is trained to identify.

The second hierarchical level of the hierarchical machine learning environment is comprised of a machine learning model that receives the output from each of the machine learning models of the first hierarchical level. The machine learning model is trained to determine the real characteristics of the ambient audio stream. Based on the set of input values, the machine learning model of the second hierarchical level is trained to determine the real characteristics of the ambient audio stream and output the determined characteristics.

The third hierarchical level of the hierarchical machine learning environment is comprised of a machine learning model that receives the output from the machine learning model of the second hierarchical level, one or more current contextual state, one or more stored local contextual states, and one or more stored global contextual states. The machine learning model of the third hierarchical level is trained to determine one or more actions a user of the device would most likely want to be performed with respect to or by the user's device. In some embodiments, the one or more actions are determined based on a strength of recommendation associated with an action.

At 606, the determined action is performed. For example, the manner in which ambient sound is heard at a speaker of an active acoustic filter may change based on a processing parameter set selected by CAHOE. Beam forming may be turned on and beam form parameters associated with a microphone of an active acoustic filter may be adjusted to allow directional focus in a direction of a person. A secondary audio stream (e.g., news, music, podcast, etc.) may be provided. A good or service (e.g., a cup of coffee, a car from a ride-sharing application) may be ordered via an application installed on a personal computing device. An event or appointment may be added to an electronic calendar associated with a user of the personal audio system. A payment for goods or services (e.g., paying for a portion of or an entire dinner bill, paying for a cup of coffee) may be provided via an application (e.g., PayPal®, Venmo®, Starbucks®) installed on a personal computing device, etc. A voice prompt requesting verification from the user of the personal audio system to perform the command may be provided. An audio or visual notification may be provided.

At 608, feedback may be received from a user of the personal audio system. The feedback can be positive feedback. The personal audio system may provide a voice or audio prompt asking if the determined action is the correct action to perform and receive an input (verbal or through a user interface) from the user on whether the determined action is correct. Lack of user input after a determined action is perform can indicate positive feedback. The feedback can also be negative feedback. A user modification to audio processing parameters after the parameters are changed or a decline of a suggesting activity can indicate the wrong action set was selected. At 610, the feedback is provided to CAHOE and may be used to adjust at least one of the machine learning models of the hierarchical machine learning environment.

Figure 7:
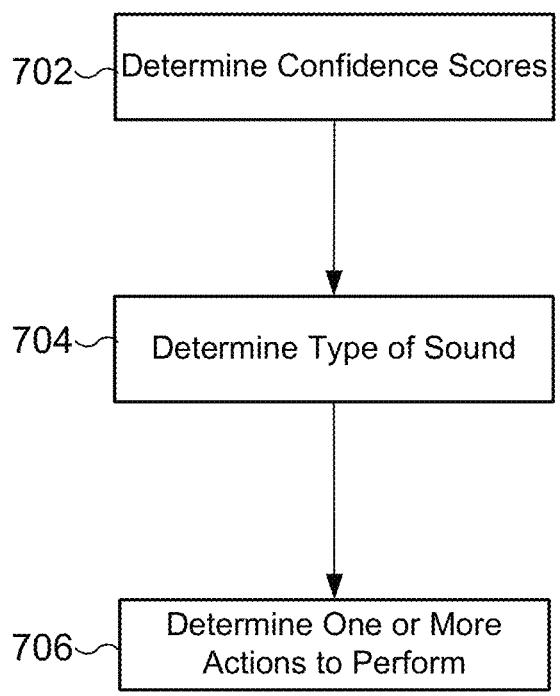
FIG. 7 is a flow chart illustrating an embodiment of a process for determining an action to perform.

FIG. 7 is a flow chart illustrating an embodiment of a process for determining an action to perform. In the example shown, the process can be implemented by processor 230 or processor 310. In some embodiments, processor 700 can be implemented to perform step 604.

At 702, confidence scores are determined. Each machine learning model of the first hierarchical level has been trained to identify different characteristics of an ambient audio stream, such as whether the ambient audio stream matches a known ambient sound profile, includes a particular type of audio signal, or includes one or more trigger words. Each of the machine learning models of the first hierarchical level outputs a confidence value that indicates whether the ambient audio stream includes the characteristic to which the machine learning model is trained to identify.

At 704, one or more real characteristics of the ambient sound signal are determined based on the confidence scores. The machine learning model of a second hierarchical level is trained to determine real characteristics of the ambient audio stream. For example, the ambient audio stream may cause a first machine learning model to output a value that indicates that the ambient audio stream includes a siren signal and a second machine learning model to output a value that indicates that the ambient audio stream includes a female voice, but the ambient audio stream causes a third machine learning model to output a value that indicates that the ambient audio stream does not include speech. Based on the set of input values, the machine learning model of the second hierarchical level is trained to determine the real characteristics of the ambient audio stream and output the determined characteristics.

At 706, one or more actions to perform are determined based on the one or more real characteristics and a combination of one or more current contextual state, one or more stored local contextual states, and one or more stored global contextual states. The third hierarchical level of the hierarchical machine learning environment is comprised of a machine learning model that receives the output from the machine learning model of the second hierarchical level, one or more current contextual states, one or more stored local contextual states, and one or more stored global contextual states. The machine learning model of the third hierarchical level is trained to determine one or more actions a user of the device would most likely want to be performed with respect to or by the user's device. In some embodiments, the one or more actions are determined based on a strength of recommendation associated with an action.

Figure 8:
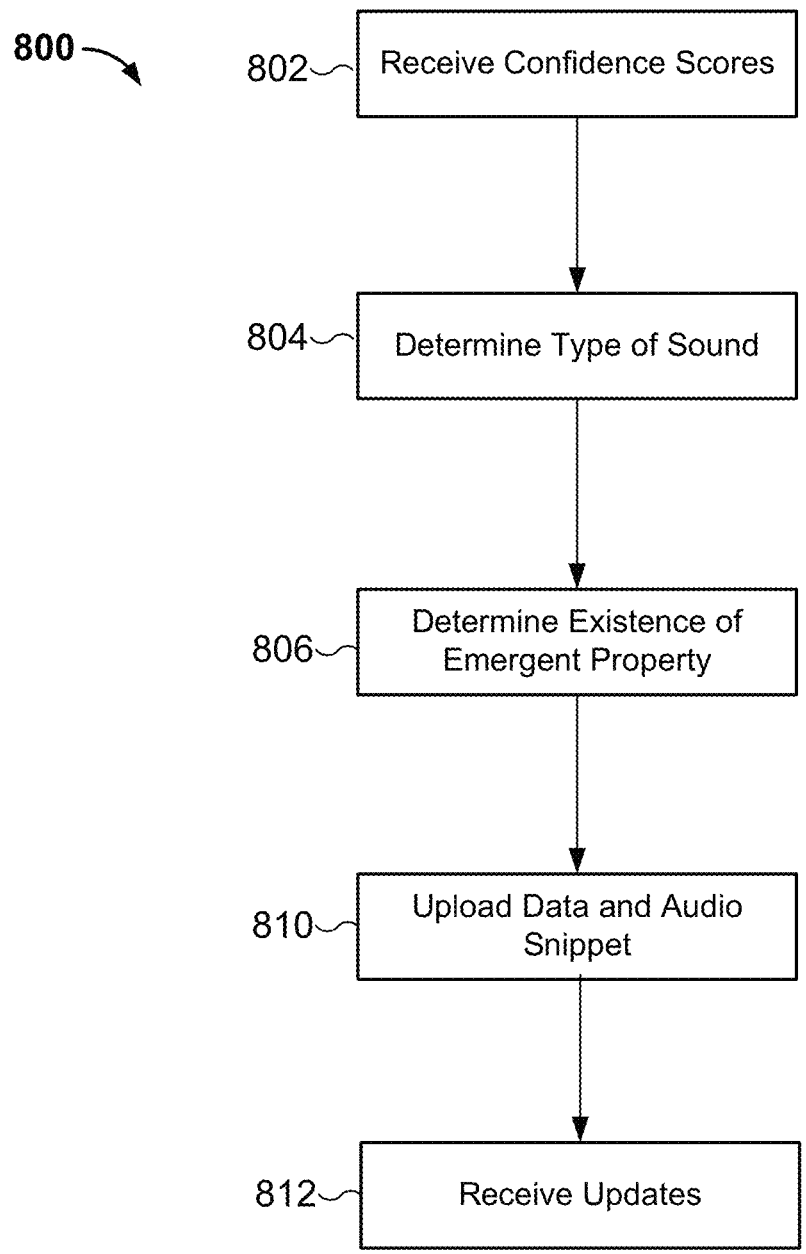
FIG. 8 is a flow chart illustrating an embodiment of a process for detecting emergent properties of an ambient audio stream.

FIG. 8 is a flow chart illustrating an embodiment of a process for detecting emergent properties of an ambient audio stream. In the example shown, the process can be implemented by processor 230 or processor 310.

At 802, one or more confidence scores are received. A confidence score indicates a confidence level that an input ambient audio signal includes the particular type of sound, sound profile, or one or more trigger words to which a machine learning model is trained. At 804, one or more real characteristics of the ambient sound signal are determined based on the confidence scores.

At 806, it is determined whether the combination of confidence scores indicate that a non-classified sound, i.e., an emergent property, exists in addition to the one or more real characteristics. An ambient audio stream may include audio signals other than what was identified by the plurality of first level hierarchical machine learning models. Based on several samples, the machine learning models may output confidence scores that suggest another signal is present. For example, a machine learning model may output a confidence score of 0.6 male, 0.4 female, but another machine learning model contradicts this output and outputs a confidence score of 0.1 that the ambient audio stream includes a speech signal. In the event certain related machine learning models contradict each other, it is determined that the ambient sound signal may include an emergent property. In some embodiments, when certain related machine learning models contradict each other more than a threshold number of times, it is determined that the ambient sound signal may include an emergent property. A machine learning model may be related to another machine learning model when the outputs of the machine learning models are directly related to each other. For example, a machine learning model that is trained to identify speech in an ambient sound stream is related to a machine learning model that is trained to identify whether a female voice or a male voice is included in an ambient sound stream because both machine learning models output a value indicative of whether an ambient sound stream includes a voice.

At 810, the confidence scores, current contextual state, and the associated ambient audio stream are uploaded to a remote knowledgebase, such as knowledgebase 150. The knowledgebase receives the confidence scores, the current contextual state, and associated ambient audio stream and may perform analysis to determine if the ambient audio stream includes one or more emergent properties. An emergent property is a characteristic of an ambient audio stream that was not properly identified by CAHOE. Machine learning techniques may be applied to the confidence scores, current contextual state, and associated ambient audio stream to detect one or more emergent properties. The knowledgebase may include one or more machine learning models that are not included in CAHOE. For example, the knowledgebase may include a machine learning model that is trained to identify whether a horn sound is included in an ambient sound stream, but a current version of CAHOE on a user's device does not include this particular machine learning model. After applying the ambient audio stream to the one or more machine learning models of the knowledgebase, it may be determined that the sound that caused a machine learning model to indicate that the ambient audio stream may include a female voice when another machine learning model indicates that the ambient audio stream does not include a speech signal, is really a horn sound because that horn-sound trained machine learning model outputs a confidence score that indicates there is a horn in the ambient audio stream. The knowledgebase may further determine that the ambient audio stream includes a horn sound because the combination of uploaded confidence scores is associated with a horn sound.

At 812, one or more updates are received. The first hierarchical level of CAHOE can be updated to include another machine learning model trained to identify the emergent property that was not previously detected. New or revised action sets learned and stored at a remote knowledgebase can be received. For example, new or recently revised action sets may be pushed to some or all of the personal audio systems on an as-available basis, which is to say as soon as the new or recently revised action sets are created. Action sets, including new and revised action sets may be transmitted to some or all of the personal audio systems at predetermined periodic intervals, such as, for example, nightly, weekly, or at some other interval. Action sets may be transmitted upon request from individual personal audio systems. Action sets may be pushed to, or downloaded by, a personal audio system based on a change in the location of the personal audio system. For example, a personal audio system that relocates to a position near or in an airport may receive one or more action sets for use in the airport and on the airplane.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising,
    receiving one or more context aware processing parameters, an ambient audio stream and a secondary audio stream, the one or more context aware processing parameters comprising one or more parameters indicating a user's current contextual state, the one or more parameters including at least one parameter corresponding to a location or a situation of the user;
    identifying, using one or more machine learning models, one or more sound characteristics associated with the ambient audio stream;
    determining, using the one or more machine learning models, one or more actions to perform based, at least in part, on the one or more context aware processing parameters and one or more identified sound characteristics, the one or more actions comprising applying one or more audio processing parameters to the ambient audio stream, the secondary audio stream, or both the ambient audio stream and the secondary audio stream, the one or more actions corresponding to personalized action sets for the user, each of the personalized action sets being associated with at least one indicator indicating conditions or circumstances in which an associated personalized action set is appropriate for selection, the at least one indicator including global contextual state information corresponding with a state of at least one other user's personal audio system;
    wherein the global contextual state information comprises an amalgamation of the contextual states of a plurality of other users; and
    performing the one or more actions.

2. The method of claim 1, wherein the at least one parameter corresponds to the location of the user and indicates a room in which the user is currently located.

3. The method of claim 1, wherein identifying the one or more sound characteristics associated with the ambient audio stream involves detecting a baby's cry.

4. The method of claim 3, wherein the one or more actions involves reducing an amount of baby cries heard by the user.

5. The method of claim 3, wherein the one or more actions involves adjusting a setting of at least one microphone.

6. The method of claim 5, wherein adjusting the setting of the at least one microphone involves initiating or modifying one or more beam forming parameters.

7. The method of claim 1, wherein the one or more audio processing parameters correspond to one or more of filtering, equalization, compression, limiting, echo cancellation or noise reduction.

8. The method of claim 1, wherein the secondary audio stream includes audio from an application being executed by a local device.

9. The method of claim 8, wherein the audio from the application corresponds to one or more of directions from a navigation app, music from a streaming music app, information from a self-guided audio tour app or a sportscaster describing a sporting event.

10. The method of claim 1, wherein the at least one indicator includes one or more of an ambient sound profile or context information.

11. The method of claim 1, further comprising retrieving the personalized action sets and the at least one indicator from a contextual state memory.

12. The method of claim 1, further comprising receiving sensor data from at least one sensor, wherein determining the one or more actions to perform is based, at least in part, on the sensor data.

13. The method of claim 1, further comprising extracting conversation data from an ambient audio stream stored in an audio snippet memory, wherein determining the one or more actions to perform is based, at least in part, on the conversation data.

14. The method of claim 1, wherein the at least one parameter corresponds to the situation of the user, further comprising determining, using the one or more machine learning models, that the one or more sound characteristics associated with the ambient audio stream correspond with the situation of the user.

15. The method of claim 14, wherein the one or more machine learning models determine that the one or more sound characteristics associated with the ambient audio stream match an ambient sound profile corresponding to the situation of the user.

16. The method of claim 15, wherein the situation of the user includes one or more of an airplane cabin situation, a dinner situation, a concert situation, a subway situation, an urban street situation, a siren situation or a crying baby situation.

17. The method of claim 1, wherein at least one of the one or more parameters corresponds to the location of the user and indicates a limited geographic area that is defined by one or more of a center point and a radius, a pair of coordinates identifying diagonal corners of a rectangular area or a series of coordinates identifying vertices of a polygon.

18. The method of claim 1, wherein the global contextual state information is downloaded dynamically based upon one or more factors.

19. The method of claim 18, wherein the one or more factors include one or more of an audio characteristic of ambient audio, a location of a personal audio system, an action set of one or more other users corresponding to similar contextual information, or time-based data.

20. The method of claim 1, further comprising downloading a global contextual state that matches the ambient sound profile and associated context information responsive to determining that the ambient sound profile and associated context information is not associated with an action set.

21. The method of claim 1, wherein the determining involves determining whether a strength of recommendation corresponding to a personalized action set is equal to or above a recommendation threshold.

22. The method of claim 21, wherein the determining involves selecting a personalized action set from a data structure that includes a plurality of personalized action sets, each personalized action set of the plurality of personalized action sets having corresponding ambient sound profile information and corresponding strength of recommendation information.

23. The method of claim 21, wherein a personalized action set is selected if the corresponding strength of recommendation is equal to or above the recommendation threshold.

24. The method of claim 21, wherein it is determined that a plurality of personalized action sets have a corresponding strength of recommendation that is equal to or above the recommendation threshold, further comprising selecting a personalized action set having a corresponding higher recommendation threshold or a corresponding highest recommendation threshold.

* * * * *

UNITED STATES PATENT AND TRADEMARK OFFICE
CERTIFICATE OF CORRECTION

| | | |
|---|---|---|
| PATENT NO. | : 11,501,772 B2 | Page 1 of 1 |
| APPLICATION NO. | : 16/780825 | |
| DATED | : November 15, 2022 | |
| INVENTOR(S) | : Jacob Meacham et al. | |

It is certified that error appears in the above-identified patent and that said Letters Patent is hereby corrected as shown below:

In the Claims

Column 26, Claim 1, Line 26, delete "method comprising," and insert --method, comprising:--.

Signed and Sealed this
Third Day of December, 2024

Katherine Kelly Vidal
*Director of the United States Patent and Trademark Office*